United States Patent
Morales et al.

(10) Patent No.: US 7,889,921 B2
(45) Date of Patent: Feb. 15, 2011

(54) NOISE REDUCED COLOR IMAGE USING PANCHROMATIC IMAGE

(75) Inventors: Efrain O. Morales, Rochester, NY (US); John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 905 days.

(21) Appl. No.: 11/752,484

(22) Filed: May 23, 2007

(65) Prior Publication Data
US 2008/0292182 A1    Nov. 27, 2008

(51) Int. Cl.
G06K 9/00 (2006.01)
H04N 3/14 (2006.01)
H04N 5/335 (2006.01)
H04N 9/04 (2006.01)
H04N 9/083 (2006.01)

(52) U.S. Cl. .................. 382/167; 382/162; 348/273; 348/276; 348/277; 348/279; 348/280

(58) Field of Classification Search ............... 382/162, 382/167; 348/272, 273, 276–280
See application file for complete search history.

(56) References Cited

U.S. PATENT DOCUMENTS

| | | | |
|---|---|---|---|
| 5,264,924 A | | 11/1993 | Cok |
| 5,506,619 A | * | 4/1996 | Adams et al. ............ 348/272 |
| 6,366,319 B1 | * | 4/2002 | Bills ....................... 348/273 |
| 6,421,084 B1 | * | 7/2002 | Chang et al. ............ 348/273 |
| 6,476,865 B1 | * | 11/2002 | Gindele et al. ........... 348/277 |
| 6,646,246 B1 | | 11/2003 | Gindele et al. |
| 6,744,916 B1 | * | 6/2004 | Takahashi ................. 382/162 |
| 7,065,246 B2 | | 6/2006 | Xiaomang et al. |
| 7,502,505 B2 | * | 3/2009 | Malvar et al. ............. 382/162 |
| 7,565,007 B2 | * | 7/2009 | Ishiga ...................... 382/162 |
| 2004/0032516 A1 | * | 2/2004 | Kakarala .................. 348/246 |
| 2004/0169749 A1 | | 9/2004 | Acharya |
| 2006/0062562 A1 | * | 3/2006 | Utagawa ................... 396/213 |
| 2006/0269158 A1 | | 11/2006 | O'Hara et al. |
| 2007/0024879 A1 | | 2/2007 | Hamilton, Jr. et al. |
| 2007/0024931 A1 | | 2/2007 | Compton et al. |
| 2007/0024934 A1 | * | 2/2007 | Andams et al. ........... 358/525 |
| 2008/0112612 A1 | * | 5/2008 | Adams et al. ............ 382/167 |
| 2008/0123997 A1 | * | 5/2008 | Adams et al. ............ 382/299 |

FOREIGN PATENT DOCUMENTS

WO     91/09493    6/1991

OTHER PUBLICATIONS

XP-002482502, Spectrally Consistent Satellite Image Fusion with Improved Image Priors, by 2006 IEEE, Aanaes, et al., p. 14-14.

* cited by examiner

Primary Examiner—Samir A Ahmed
Assistant Examiner—Li Liu
(74) Attorney, Agent, or Firm—Raymond L. Owens (57) ABSTRACT

A method for producing a noise-reduced digital color image, includes providing an image having panchromatic pixels and color pixels corresponding to at least two color photoresponses; providing from the image a panchromatic image and at least one color image; and using the panchromatic image and the color image to produce the noise-reduced digital color image by setting a plurality of color characteristics equal to the corresponding panchromatic characteristics at each color pixel location.

9 Claims, 7 Drawing Sheets

|     |     |     |     |     |
| --- | --- | --- | --- | --- |
| $R_3$ |     | $R_6$ |     | $R_9$ |
|     |     |     |     |     |
| $R_2$ |     | $R_5$ |     | $R_8$ |
|     |     |     |     |     |
| $R_1$ |     | $R_4$ |     | $R_7$ |

*FIG. 7*

| $P_3$ | $P_6$ | $P_9$ |
| --- | --- | --- |
| $P_2$ | $X_5$ | $P_8$ |
| $P_1$ | $P_4$ | $P_7$ |

*FIG. 6*

|   |   |   |
|---|---|---|
| P₁ | P₂ | P₃ |
| P₄ | P₅ | P₆ |
| P₇ | P₈ | P₉ |

*FIG. 9*

|   |   |   |
|---|---|---|
| R₁ | R₂ | R₃ |
| R₄ | R₅ | R₆ |
| R₇ | R₈ | R₉ |

*FIG. 8*

NOISE REDUCED COLOR IMAGE USING PANCHROMATIC IMAGE

CROSS REFERENCE RELATED APPLICATION

Reference is made to commonly-assigned U.S. Ser. No. 11/558,571, filed Nov. 10, 2007 (U.S. Patent Application Publication No. 2008/0112612), of James E. Adams, Jr., et al., entitled "NOISE REDUCTION OF PANCHROMATIC AND COLOR IMAGE".

FIELD OF THE INVENTION

The invention relates generally to the field of digital image processing operations that produce a full-color noise-reduced full-resolution image from an image having panchromatic and color pixels.

BACKGROUND OF THE INVENTION

One of the most common and frequently essential image processing operations is noise reduction. This is especially true for digital still and video camera images that may have been captured under insufficient lighting conditions. One way to address digital image capture under less than optimum lighting conditions is to either acquire or synthesize one or more color channels that are particularly sensitive to low or insufficient scene illumination. The data from the channels with increased light sensitivity are generally used to guide the subsequent image processing of the data from the accompanying standard color channels. Noise reduction is a prime candidate for benefiting from this additional image data. A number of examples exist in the literature. U.S. Pat. No. 6,646,246 (Gindele, et al.) teaches using an extended dynamic range color filter array (CFA) pattern with slow and fast pixels, noise-cleaning the slow pixel data using only slow pixel data and noise-cleaning the fast pixel data using only fast pixel data. This approach achieved noise reduction at the expense of image resolution as each color channel is now subdivided into a fast channel and a slow channel and the subsequent merger can produce image processing artifacts more troublesome than the addressed original noise. U.S. Pat. No. 7,065,246 (Xiaomang, et al.) is representative of a fair number of similarly disclosed inventions in that it reveals constructing a luminance signal from directly sensed color channel data, in this case cyan, magenta, yellow, and green. The high-frequency component of the constructed luminance is used to replace the high-frequency component of the original color channel signals to affect a net noise reduction of the image data. Although somewhat effective, the major liability of this approach is that the synthesized luminance channel is constructed from noisy color channel components resulting in an essentially equally noisy synthetic channel.

A suggestion of a better approach can be found in U.S. Pat. No. 5,264,924 (Cok). Cok discloses direct measurement of red, green, blue, and luminance values at each pixel location. The high-frequency luminance data which is designed to be inherently less noisy than the corresponding high-frequency red, green, and blue data is used to replace said high-frequency red, green, and blue data to produce noise-cleaned red, green, and blue signals. Since the vast majority of digital still and video cameras use a single sensor equipped with a CFA that only senses one color channel per pixel, Cok cannot be directly practiced in such systems.

Although Xiaomang and Cok describe luminance signals, a color channel with photometric sensitivity conforming to the luminance channel of the human visual system may be unnecessarily restrictive.

SUMMARY OF THE INVENTION

It is an object of the present invention to produce a noise-reduced full-resolution full-color image from a digital image having panchromatic and color pixels.

This object is achieved by a method for producing a noise-reduced digital color image, comprising:

a. providing an image having panchromatic pixels and color pixels corresponding to at least two color photoresponses;

b. providing from the image a panchromatic image and at least one color image; and c. using the panchromatic image and the color image to produce the noise-reduced digital color image by setting a plurality of color characteristics equal to the corresponding panchromatic characteristics at each color pixel location.

It is a feature of the present invention that images can be captured under low-light conditions with a sensor having panchromatic and color pixels and processing reduces noise in a full-color image produced from the panchromatic and colored pixels. A more useful signal can be captured with a more general panchromatic channel, which has higher sensitivity at all wavelengths over the luminance channel of the human visual system.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
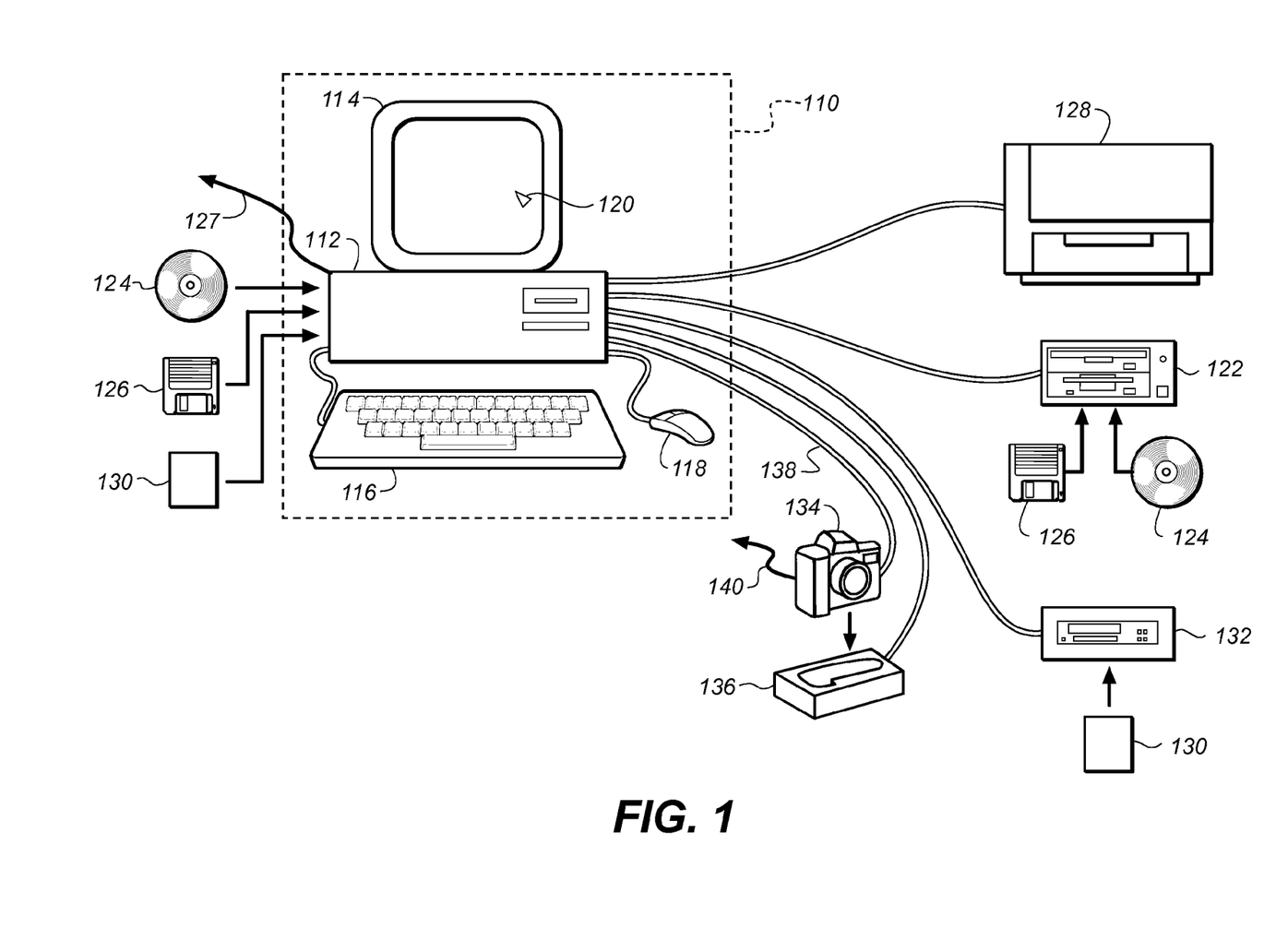
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or a floppy disk 126 can alternatively be inserted into an externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) that contains digitized images electronically embodied in the PC card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to interpolate sparsely populated images.

Figure 2:
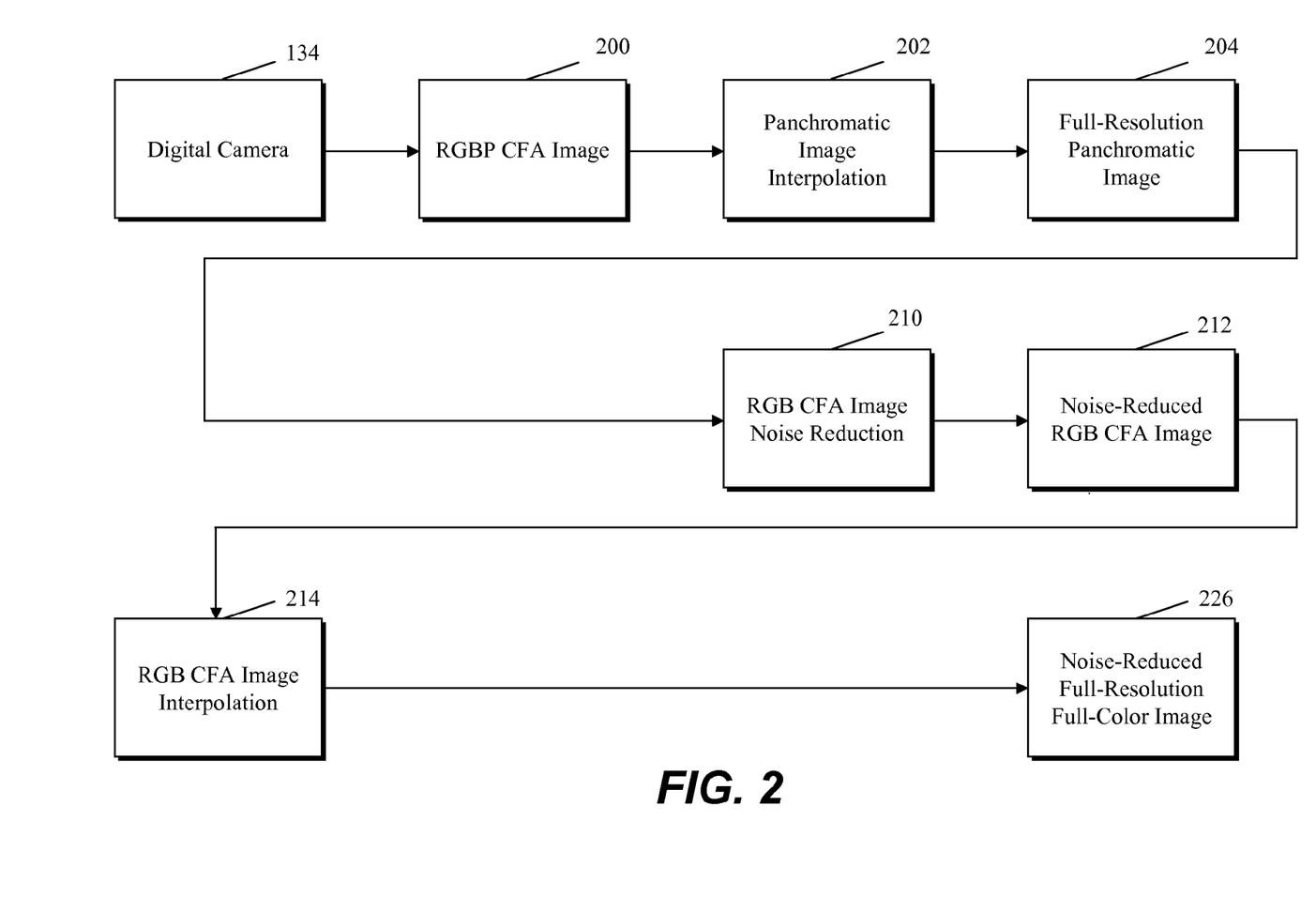
FIG. 2 is a block diagram of a preferred embodiment of the present invention.

FIG. 2 is a high level diagram of a preferred embodiment. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a full-resolution panchromatic image 204. At this point in the image processing chain each color pixel location has an associated panchromatic value and either a red, green, or blue value. With the help of the full-resolution panchromatic image the noise associated with the red, green, and blue pixel values is now reduced in an RGB CFA image noise reduction block 210 to produce a noise-reduced RGB CFA image 212. An RGB CFA image interpolation block 214 subsequently produces a noise-reduced full-resolution full-color image 226.

Figure 3:
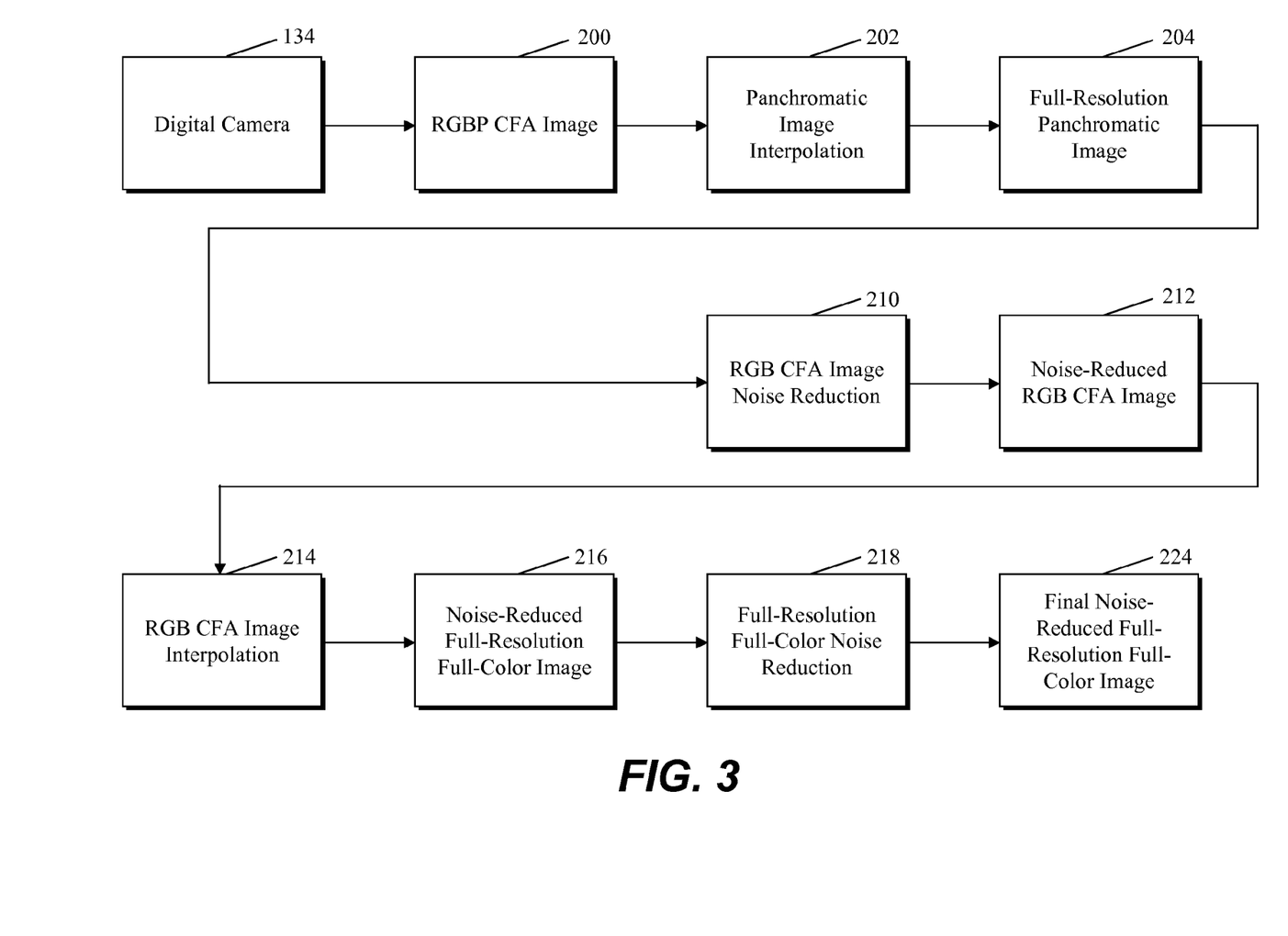
FIG. 3 is a block diagram of an alternate embodiment of the present invention.

FIG. 3 is a high level diagram of a second preferred embodiment. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a full-resolution panchromatic image 204. At this point in the image processing chain each color pixel location has an associated panchromatic value and either a red, green, or blue value. With the help of the full-resolution panchromatic image the noise associated with the red, green, and blue pixel values is now reduced in an RGB CFA image noise reduction block 210 to produce a noise-reduced RGB CFA image 212. An RGB CFA image interpolation block 214 subsequently produces a noise-reduced full-resolution full-color image 216. Finally, a full-resolution full-color noise reduction block 218 produces a final noise-reduced full-resolution full-color image block 224.

Figure 4:
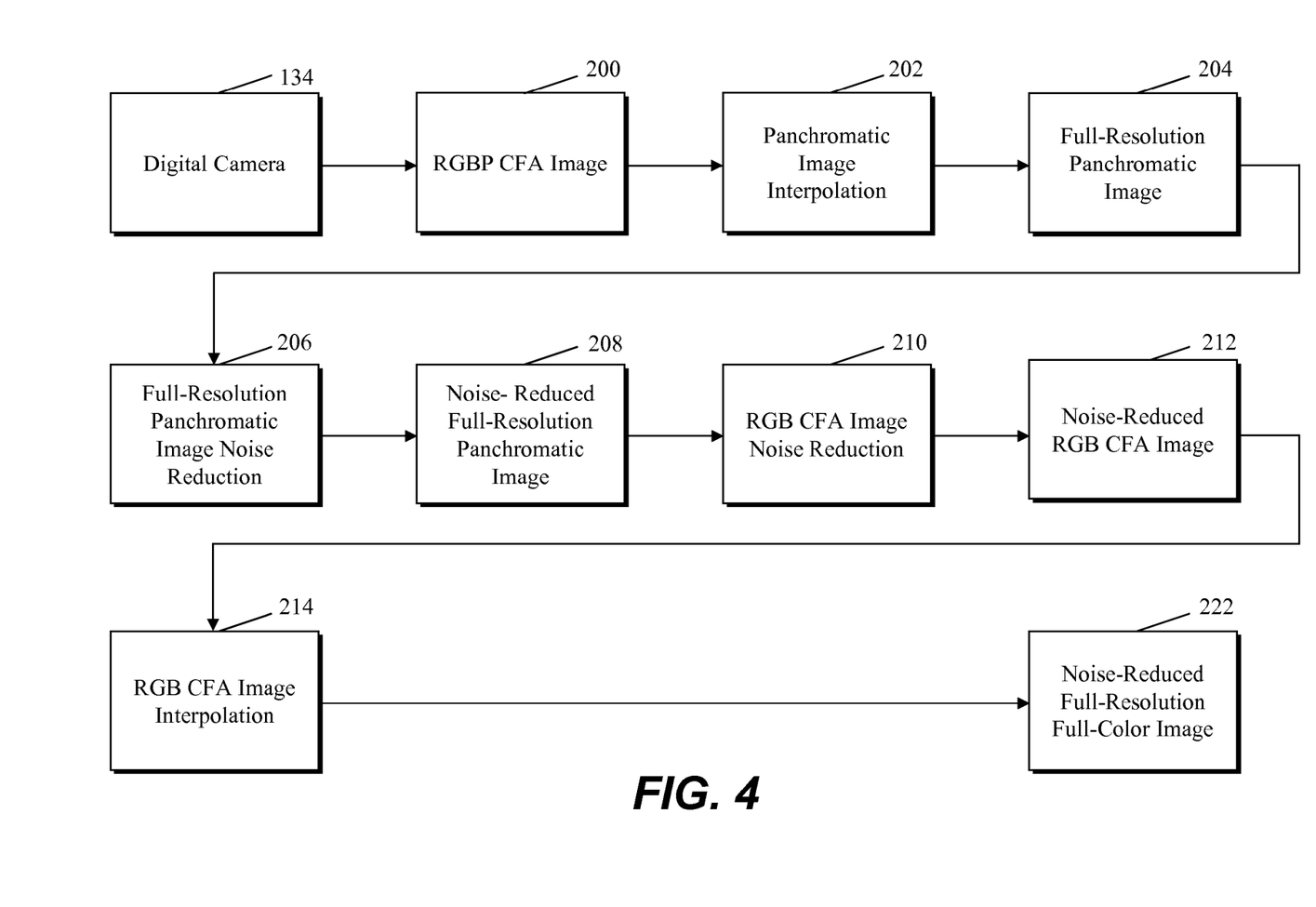
FIG. 4 is a block diagram of an alternate embodiment of the present invention.

FIG. 4 is a high level diagram of a preferred embodiment. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a full-resolution panchromatic image 204. At this point in the image processing chain each color pixel location has an associated panchromatic value and either a red, green, or blue value. Next a full-resolution panchromatic image noise reduction block 206 produces a noise-reduced full-resolution panchromatic image 208. With the help of the noise-reduced full-resolution panchromatic image the noise associated with the red, green, and blue pixel values is now reduced in an RGB CFA image noise reduction block 210 to produce a noise-reduced RGB CFA image 212. An RGB CFA image interpolation block 214 subsequently produces a noise-reduced full-resolution full-color image 222.

Figure 5:
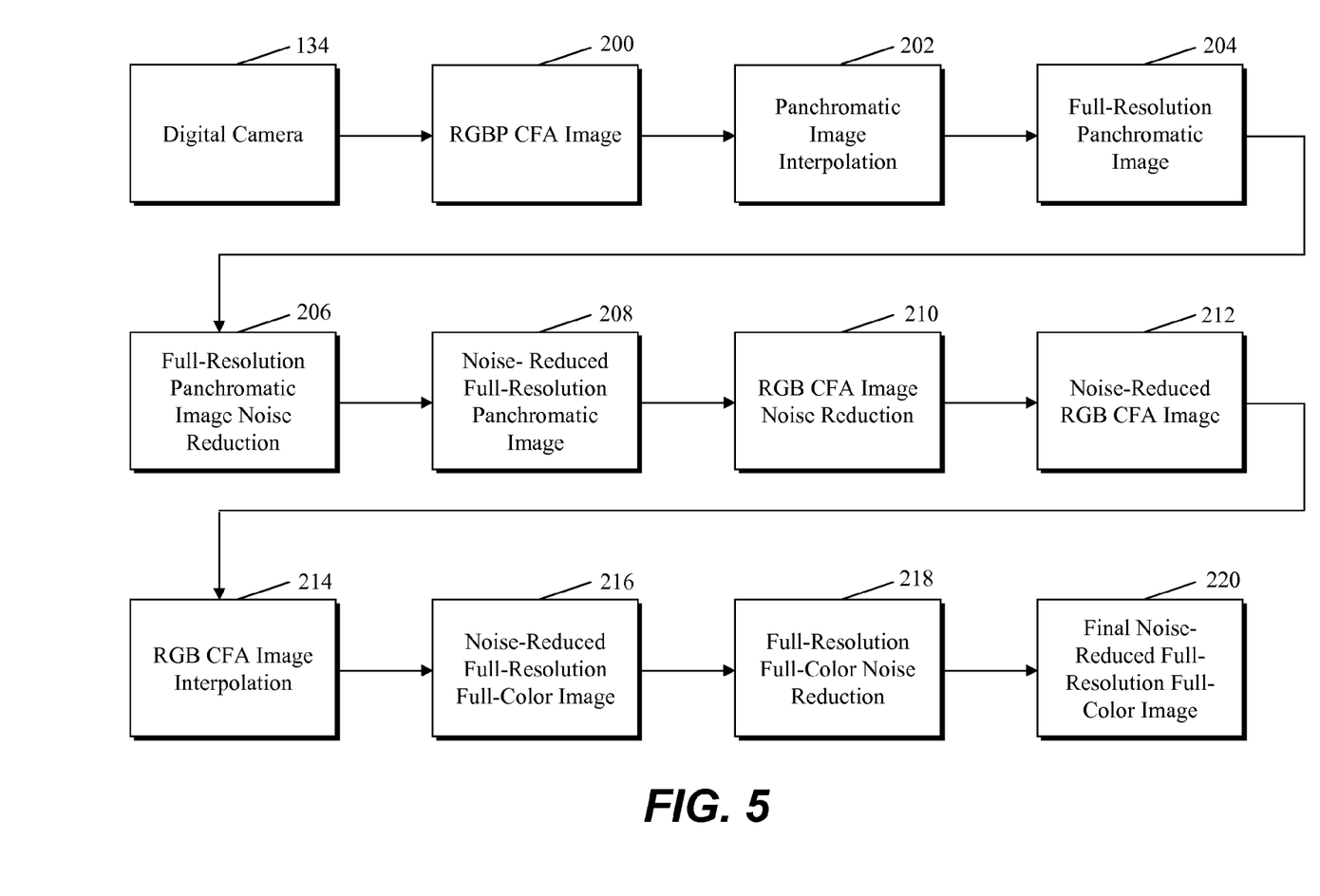
FIG. 5 is a block diagram of an alternate embodiment of the present invention.

FIG. 5 is a high level diagram of a preferred embodiment. The digital camera 134 is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a full-resolution panchromatic image 204. At this point in the image processing chain each color pixel location has an associated panchromatic value and either a red, green, or blue value. Next a full-resolution panchromatic image noise reduction block 206 produces a noise-reduced full-resolution panchromatic image 208. With the help of the noise-reduced full-resolution panchromatic image the noise associated with the red, green, and blue pixel values is now reduced in an RGB CFA image noise reduction block 210 to produce a noise-reduced RGB CFA image 212. An RGB CFA image interpolation block 214 subsequently produces a noise-reduced full-resolution full-color image 216. Finally, a full-resolution full-color noise reduction block 218 produces a final noise-reduced full-resolution full-color image block 220.

Figure 6:
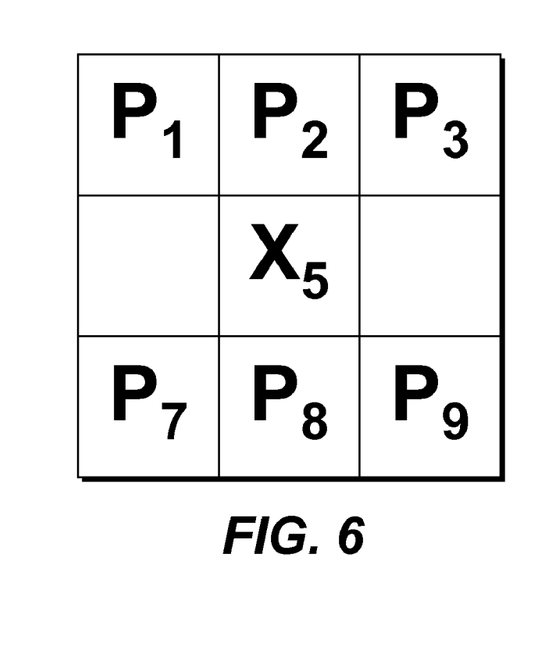
FIG. 6 is a region of pixels used in block 202 in FIG. 2.

Returning to FIG. 2, panchromatic image interpolation block 202 can be performed in any appropriate way known to those skilled in the art. Two examples are now given. Referring to FIG. 6, one way to estimate a panchromatic value for pixel $X_5$ is to simply average the surrounding six panchromatic values, i.e.:

$$X_5 = (P_1 + P_2 + P_3 + P_7 + P_8 + P_9)/6$$

Alternate weighting to the pixel value in this approach are also well known to those skilled in the art. As an example, $$X_5 = (P_1 + 2P_2 + P_3 + P_7 + 2P_8 + P_9)/8$$

Alternately, an adaptive approach can be used by first computing the absolute values of directional gradients (absolute directional gradients).

$$B_5 = |P_1 - P_9|$$

$$V_5 = |P_2 - P_8|$$

$$S_5 = |P_3 - P_7|$$

The value of $X_5$ is now determined by one of three two-point averages.

$$BX_5 = (P_1 + P_9)/2$$

$$VX_5 = (P_2 + P_8)/2$$

$$SX_5 = (P_3 + P_7)/2$$

The two-point average associated with the smallest value of the set of absolute direction gradients is used for computing $X_5$, e.g., if $V_5 \leq B_5$ and $V_5 \leq S_5$, then $X_5 = VX_5$.

Figure 8:
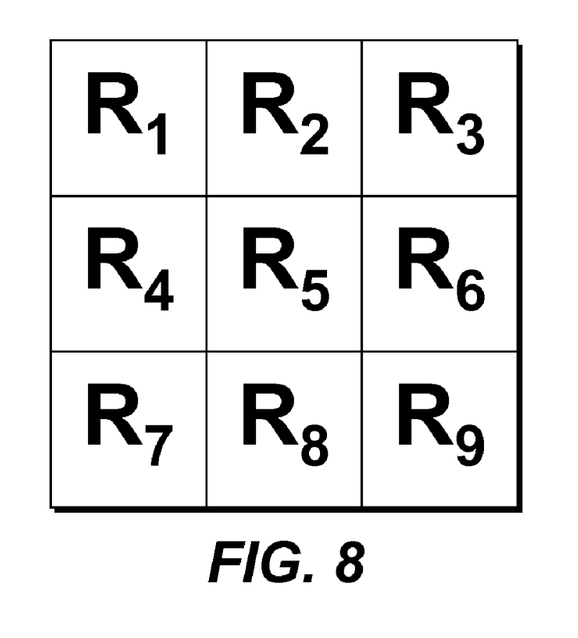
FIG. 8 is a region of pixels used in block 210 in FIG. 3.

Returning to FIG. 2, RGB CFA image noise reduction block 210 is performed by setting a plurality of color characteristics equal to the corresponding panchromatic characteristics at each color pixel location. Any number of such characteristics will be known to those skilled in the arts. As an example, referring to FIG. 8, a first spatial red pixel difference, also known as a directional gradient, from pixel $R_5$ can be defined within the shown neighborhood in eight different directions:

$R_1 - R_5$ (north-west)
$R_2 - R_5$ (north)
$R_3 - R_5$ (north-east)
$R_4 - R_5$ (west)
$R_6 - R_5$ (east)
$R_7 - R_5$ (south-west)
$R_8 - R_5$ (south)
$R_9 - R_5$ (south-east).

Another example of a color characteristic is the second spatial pixel difference. Again referring to FIG. 8, a second red pixel difference from pixel $R_5$ can be given within the shown neighborhood in four different directions:

$2R_5 - R_1 - R_9$ (backslash)
$2R_5 - R_2 - R_8$ (vertical)
$2R_5 - R_3 - R_7$ (slash)
$2R_5 - R_4 - R_6$ (horizontal).

Figure 7:
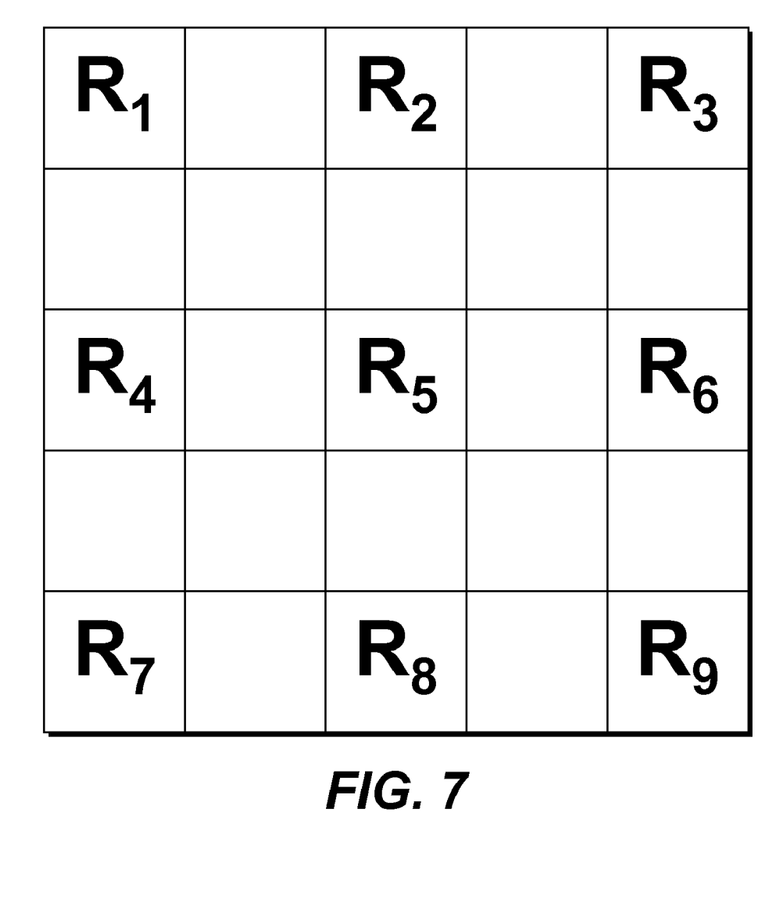
FIG. 7 is a region of pixels used in block 206 in FIG. 2.

Four examples of the invention are now given. Referring to FIG. 7, it is to be noted that each pixel location has an associated panchromatic value. It is also noted that the number and placement of intervening non-red pixels (i.e., blank pixels in FIG. 7) is irrelevant. All that is required is a central pixel value with at least one or more neighboring pixel values of the same color. It is also noted that even though FIG. 7 depicts a square pixel neighborhood that is 5 pixels high and 5 pixels wide, any size and shape neighborhood may be used. Also, in the following discussion, green or blue would be substituted for red when cleaning the green or blue color channels. Since the panchromatic channel is faster than the red channel, the panchromatic channel has less noise than the red channel and setting the first spatial red pixel difference averaged over a valid pixel neighborhood equal to the first spatial panchromatic pixel difference averaged over the same pixel neighborhood reduces the noise of the red pixel $R_5$. This is accomplished by computing the following weighted average.

$$R_5 = [c_1(P_1 - P_5 + R_1) + c_2(P_2 - P_5 + R_2) + c_3(P_3 - P_5 + R_3) +$$
$$c_4(P_4 - P_5 + R_4) + c_5(P_5 - P_5 + R_5) + c_6(P_6 - P_5 + R_6) +$$
$$c_7(P_7 - P_5 + R_7) + c_8(P_8 - P_5 + R_8) + c_9(P_9 - P_5 + R_9)] /$$
$$(c_1 + c_2 + c_3 + c_4 + c_5 + c_6 + c_7 + c_8 + c_9)$$

The weighting coefficients $c_1$ through $c_9$ define a valid pixel neighborhood and are computed from differences in panchromatic values and from differences in red values.

$c_1 = 1$ if $|P_1 - P_5| \leq t_p$ and $|R_1 - R_5| \leq t_r$, otherwise $c_1 = 0$ $c_2 = 1$ if $|P_2 - P_5| \leq t_p$ and $|R_2 - R_5| \leq t_r$, otherwise $c_2 = 0$ $c_3=1$ if $|P_3-P_5|\leq t_p$ and $|R_3-R_5|\leq t_r$, otherwise $c_3=0$ $c_4=1$ if $|P_4-P_5|\leq t_p$ and $|R_4-R_5|\leq t_r$, otherwise $c_4=0$ $c_5=1$ if $|P_5-P_5|\leq t_p$ and $|R_5-R_5|\leq t_r$, otherwise $c_5=0$ $c_6=1$ if $|P_6-P_5|\leq t_p$ and $|R_6-R_5|\leq t_r$, otherwise $c_6=0$ $c_7=1$ if $|P_7-P_5|\leq t_p$ and $|R_7-R_5|\leq t_r$, otherwise $c_7=0$ $c_8=1$ if $|P_8-P_5|\leq t_p$ and $|R_8-R_5|\leq t_r$, otherwise $c_8=0$ $c_9=1$ if $|P_9-P_5|\leq t_p$ and $|R_9-R_5|\leq t_r$, otherwise $c_9=0$ In these expressions $t_p$ and $t_r$ are predetermined positive threshold values that are chosen to exclude pixel values that are separated from the central pixel ($R_5$) by any edges in the pixel neighborhood shown in FIG. 7. It is noted that by these definition $c_5$ is always 1; this is to assure that we always include at least one pixel in the summation. Alternate schemes for populating the weighting coefficients, and for choosing the valid neighborhoods, may be used and can be adapted to using full-resolution panchromatic data. For example, the weighting coefficients may be calculated such that they take on any value between zero and one.

An alternate method to the one described above is to use the second spatial pixel difference averaged over a valid pixel neighborhood. Again referring to FIG. 7, setting the second spatial red pixel difference averaged over a valid pixel neighborhood equal to second spatial panchromatic pixel difference averaged over the same pixel neighborhood reduces the noise of the red pixel $R_5$.

$$R_5 = [d_1(-P_1+2P_5-P_9+R_1+R_9)/2 +$$
$$d_2(-P_2+2P_5-P_8+R_2+R_8)/2 +$$
$$d_3(-P_3+2P_5-P_7+R_3+R_7)/2 +$$
$$d_4(-P_4+2P_5-P_6+R_4+R_6)/2+R_5]/(d_1+d_2+d_3+d_4+1)$$

The weighting coefficients $d_1$ through $d_4$ define a valid pixel neighborhood and are computed from differences in panchromatic values and from differences in red values.

$d_1=1$ if $|P_1-P_5|\leq t_p$ and $|P_9-P_5|\leq t_p$ and $|R_1-R_5|\leq t_r$ and $|R_9-R_5|\leq t_r$, otherwise $d_1=0$ $d_2=1$ if $|P_2-P_5|\leq t_p$ and $|P_8-P_5|\leq t_p$ and $|R_2-R_5|\leq t_r$ and $|R_8-R_5|\leq t_r$, otherwise $d_2=0$ $d_3=1$ if $|P_3-P_5|\leq t_p$ and $|P_7-P_5|\leq t_p$ and $|R_3-R_5|\leq t_r$ and $|R_7-R_5|\leq t_r$, otherwise $d_3=0$ $d_4=1$ if $|P_4-P_5|\leq t_p$ and $|P_6-P_5|\leq t_p$ and $|R_4-R_5|\leq t_r$ and $|R_6-R_5|\leq t_r$, otherwise $d_4=0$ In these expressions $t_p$ and $t_r$ are predetermined positive threshold values that are chosen to exclude pixel values that are separated from the central pixel ($R_5$) by any edges in the pixel neighborhood shown in FIG. 7. It is noted that by these definition all the weighting functions can be zero simultaneously; to assure that we always include at least one pixel in the summation $R_5$ is added to the numerator and 1 is added to the denominator on the weighted sum above. An alternate method is to use the median of all the first spatial pixel differences in a valid pixel neighborhood. Again referring to FIG. 7, setting the median of all the first spatial red pixel differences in a valid pixel neighborhood equal to the median of all the first spatial panchromatic pixel differences in the same pixel neighborhood reduces the noise of the red pixel $R_5$. First, one panchromatic and one red 9-point median values are computed.

$P_M$=median[$(P_1-P_5), (P_2-P_5), (P_3-P_5), (P_4-P_5),$
$(P_5-P_5), (P_6-P_5), (P_7-P_5), (P_8-P_5), (P_9-P_5)$]

$R_M$=median[$(R_1-R_5), (R_2-R_5), (R_3-R_5), (R_4-R_5),$
$(R_5-P_5), (R_6-R_5), (R_7-R_5), (R_8-R_5), (R_9-R_5)$]

$R_M$ is set equal to $P_M$ and, noting that adding or subtracting a constant from all the terms inside the median operator does not change the order of the terms, the expression is solved for $R_5$.

$R_5$=median($R_1, R_2, R_3, R_4, R_5, R_6, R_7, R_8, R_9$)−median
$(P_1, P_2, P_3, P_4, P_5, P_6, P_7, P_8, P_9)+P_5$.

An alternate method is to simultaneously use both the first and second spatial pixel differences averaged over a valid pixel neighborhood. Again referring to FIG. 7, setting the average of the first and second spatial red pixel differences averaged over a valid pixel neighborhood equal to the average of the first and second spatial panchromatic pixel differences averaged over the same pixel neighborhood reduces the noise of the red pixel $R_5$.

$R_5 = [c_1(P_1-P_5+R_1)+c_2(P_2-P_5+R_2)+c_3(P_3-P_5+R_3)+c_4$
$(P_4-P_5+R_4)+c_5(P_5-P_5+R_5)+c_6(P_6-P_5+R_6)+c_7$
$(P_7-P_5+R_7)+c_8(P_8-P_5+R_8)+c_9(P_9-P_5+R_9)]/2$
$(c_1+c_2+c_3+c_4+c_5+c_6+c_7+c_8+c_9)+[d_1(-P_1+2P_5-$
$P_9+R_1+R_9)/2+d_2(-P_2+2P_5-P_8+R_2+R_8)/2+d_3(-$
$P_3+2P_5-P_7+R_3+R_7)/2+d_4(-P_4+2P_5-P_6+R_4+R_6)/$
$2+R_5]/2(d_1+d_2+d_3+d_4+1)$

The weighting coefficients $c_1$ through $c_9$ and $d_1$ through $d_4$ are the same as above. The average of the first and second spatial pixel differences can also be replaced by a weighted average, and the weights may be either fixed or calculated according to, for example, how close $R_5$ is to an edge.

Alternate methods to the four examples discussed above include using the maximum of the first spatial pixel differences, the minimum of the first spatial pixel differences, and an adaptive directional median filter. Still more alternate methods are possible by utilizing other panchromatic characteristics that are known to those skilled in the art in conjunction with other well-known noise reduction methods such as, but not limited to, infinite impulse response (IIR) filtering and singular value decomposition (SVD).

It is also well known by those skilled in the art that pixel neighborhoods such as depicted in FIG. 7 can result from Laplacian or Gaussian pyramid decompositions or wavelet decompositions of the image data. By simultaneously applying the same decomposition methods to the full-resolution panchromatic data, each resulting pixel within each RGB image decomposition component will still have an associated panchromatic value. Therefore, the foregoing discussion and examples remain relevant and unaltered.

Returning to FIG. 2, RGB CFA image interpolation block 214 can be performed using any of the well-known CFA interpolation or demosaicking techniques described in the prior art. U.S. Pat. No. 5,852,468 (Okada) describes a typical non-adaptive method while U.S. Pat. No. 5,506,619 (Adams, et al.) teaches a representative adaptive approach.

In FIG. 3, full-resolution full-color noise reduction block 216 can be performed in a manner similar to the RGB CFA image noise reduction block 210, only in block 216 there are red, green, blue, and panchromatic values at each pixel location. Therefore, noise reduction can be performed using contiguous pixel neighborhoods, such as depicted in FIG. 8.

When referenced to FIG. 8, the examples given above of the average first spatial pixel difference, average second spatial pixel difference, and median first spatial pixel difference are directly applicable.

Figure 9:
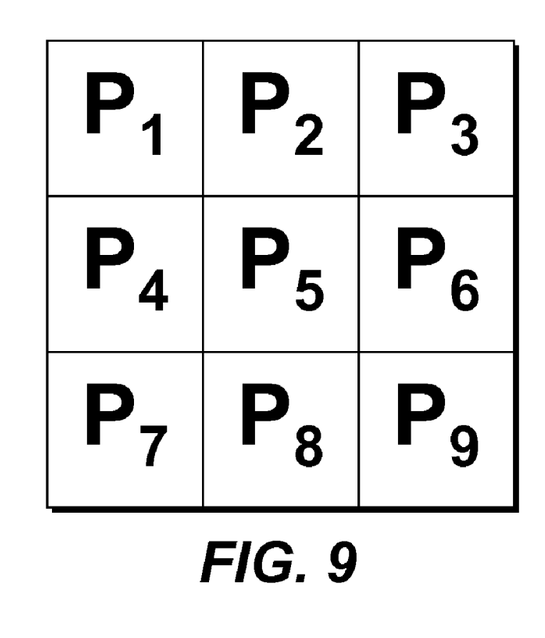
FIG. 9 is a region of pixels used in block 204 in FIG. 4.

In FIG. 4, full-resolution panchromatic image noise reduction block 206 would be performed using any of the well-known methods in the prior art for grayscale or single-channel image noise reduction. Referring to FIG. 9, a sigma filter can be used to accomplish noise reduction of the panchromatic pixel $P_5$. This is accomplished by computing the following weighted average.

$$P_5 = (c_1 P_1 + c_2 P_2 + c_3 P_3 + c_4 P_4 + c_5 P_5 + c_6 P_6 + c_7 P_7 + c_8 P_8 + c_9 P_9) / (c_1 + c_2 + c_3 + c_4 + c_5 + c_6 + c_7 + c_8 + c_9)$$

The weighting coefficients $c_1$ through $c_9$ are computed from differences in panchromatic values.

$c_1=1$ if $|P_1-P_5|\leq t$, otherwise $c_1=0$ $c_2=1$ if $|P_2-P_5|\leq t$, otherwise $c_2=0$ $c_3=1$ if $|P_3-P_5|\leq t$, otherwise $c_3=0$ $c_4=1$ if $|P_4-P_5|\leq t$, otherwise $c_4=0$ $c_5=1$ if $|P_5-P_5|\leq t$, otherwise $c_5=0$ $c_6=1$ if $|P_6-P_5|\leq t$, otherwise $c_6=0$ $c_7=1$ if $|P_7-P_5|\leq t$, otherwise $c_7=0$ $c_8=1$ if $|P_8-P_5|\leq t$, otherwise $c_8=0$ $c_9=1$ if $|P_9-P_5|\leq t$, otherwise $c_9=0$ In these expressions t is a predetermined threshold value that is chosen to exclude pixel values that are separated from the central pixel ($P_5$) by any edges in the pixel neighborhood shown in FIG. 9. It is noted that by these definition $C_5$ is always 1; this is to assure that we always include at least one pixel in the summation. Alternate schemes for populating sigma filter weighting coefficients are well known in the art. An alternate method is to use an adaptive median filter. Again referring to FIG. 9, four panchromatic are computed.

$P_H$=median $(P_4, P_5, P_6)$ $P_B$=median $(P_1, P_5, P_9)$ $P_V$=median $(P_2, P_5, P_8)$ $P_S$=median $(P_3, P_5, P_7)$ The noise-reduced value for $P_5$ corresponds to the panchromatic median value that is closest to original panchromatic value associated with $P_5$.

$P_5=P_H$ if $|P_H-P_5|\leq\{|P_B-P_5|, |P_V-P_5|, |P_S-P_5|\}$ $P_5=P_B$ if $|P_B-P_5|\leq\{|P_H-P_5|, |P_V-P_5|, |P_S-P_5|\}$ $P_5=P_V$ if $|P_V-P_5|\leq\{|P_H-P_5|, |P_B-P_5|, |P_S-P_5|\}$ $P_5=P_S$ if $|P_S-P_5|\leq\{|P_H-P_5|, |P_B-P_5|, |P_V-P_5|\}$ Alternate schemes for employing adaptive median filters are well known in the art and can be used.

In addition to the methods described above, other well-known noise reduction methods such as, but not limited to, infinite impulse response (IIR) filtering and singular value decomposition (SVD) could be used.

It is also well known by those skilled in the art that pixel neighborhoods such as depicted in FIG. 9 can result from Laplacian or Gaussian pyramid decompositions or wavelet decompositions of the image data. Therefore, the foregoing discussion and examples remain relevant and unaltered.

The noise reduction algorithms disclosed in the preferred embodiments of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the noise reduction algorithms can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithms themselves can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithms can interface with a variety of workflow user interface schemes.

The noise reduction algorithms disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer 130 Personal Computer Card (PC card)
132 PC Card Reader
134 Digital Camera
136 Camera Docking Port
138 Cable Connection
140 Wireless Connection
200 RGBP CFA Image
202 Panchromatic Image Interpolation
204 Full-Resolution Panchromatic Image
206 Full-Resolution Panchromatic Image Noise Reduction
208 Noise-Reduced Full-Resolution Panchromatic Image
210 RGB CFA Image Noise Reduction
212 Noise-Reduced RGB CFA Image
214 RGB CFA Image Interpolation
216 Noise-Reduced Full-Resolution Full-Color Image
218 Full-Resolution Full-Color Noise Reduction
220 Final Noise-Reduced Full-Resolution Full-Color Image
222 Noise-Reduced Full-Resolution Full-Color Image
224 Final Noise-Reduced Full-Resolution Full-Color Image
226 Noise-Reduced Full-Resolution Full-Color Image

The invention claimed is:

1. A method for producing a noise-reduced digital image having panchromatic pixels and color pixels, comprising:
   a. providing a first image having panchromatic pixels and color pixels corresponding to at least two color photo-responses;
   b. providing from the first image a panchromatic image and interpolating the panchromatic image to provide a full-resolution panchromatic image; and
   c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a median of directional gradients among color pixels in a valid pixel neighborhood of the first image and a median of directional gradients among panchromatic pixels in a valid pixel neighborhood of the full-resolution panchromatic image.

2. The method of claim 1 wherein the color and corresponding panchromatic characteristics of step c) includes a weighted average of differences of directional gradients between color pixels in a valid pixel neighborhood of the first image and a weighted average of differences of directional gradients between panchromatic pixels in a valid pixel neighborhood of the full-resolution panchromatic image.

3. The method of claim 1 wherein step a) includes color pixels having the following photosensitivities of red, green, and blue.

4. The method of claim 1 wherein step a) includes color pixels having the following photosensitivities of cyan, magenta, and yellow.

5. A method for producing a noise-reduced digital image having panchromatic pixels and color pixels, comprising:
   a. providing a first image having panchromatic pixels and color pixels corresponding to at least two color photo-responses;
   b. providing from the first image a panchromatic image and interpolating the panchromatic image to provide a full-resolution panchromatic image; and
   c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a median of differences of directional gradients among color pixels in a valid pixel neighborhood of the first image and a median of differences of directional gradients among panchromatic pixels in a valid pixel neighborhood of the full-resolution panchromatic image.

6. A method for producing a noise-reduced digital image having panchromatic pixels and color pixels, comprising:
   a. providing a first image having panchromatic pixels and color pixels corresponding to at least two color photo-responses;
   b. providing from the first image a panchromatic image and interpolating the panchromatic image to provide a full-resolution panchromatic image; and
   c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a maximum of directional gradients among color pixels in a valid pixel neighborhood of the first image and a maximum of directional gradients among panchromatic pixels in a valid pixel neighborhood of the full-resolution panchromatic image.

7. A method for producing a noise-reduced digital image having panchromatic pixels and color pixels, comprising:
   a. providing a first image having panchromatic pixels and color pixels corresponding to at least two color photo-responses;
   b. providing from the first image a panchromatic image and interpolating the panchromatic image to provide a full-resolution panchromatic image; and
   c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a maximum of differences of directional gradients among color pixels in a valid pixel neighborhood of the first image and a maximum of differences of directional gradients among panchromatic pixels in a valid pixel neighborhood of the full-resolution panchromatic image.

8. A method for producing a noise-reduced digital image having panchromatic pixels and color pixels, comprising:
   a. providing a first image having panchromatic pixels and color pixels corresponding to at least two color photo-responses;
   b. providing from the first image a panchromatic image and interpolating the panchromatic image to provide a full-resolution panchromatic image; and
   c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a minimum of directional gradients among color pixels in a valid pixel neighborhood of the first image and a minimum of directional gradients among panchromatic pixels in a valid pixel neighborhood of the full-resolution panchromatic image.

9. A method for producing a noise-reduced digital image having panchromatic pixels and color pixels, comprising:
 a. providing a first image having panchromatic pixels and color pixels corresponding to at least two color photoresponses;
 b. providing from the first image a panchromatic image and interpolating the panchromatic image to provide a full-resolution panchromatic image; and
 c. using the full-resolution panchromatic image and the first image to produce the noise-reduced digital image by setting a plurality of color characteristics of the first image equal to corresponding panchromatic characteristics of the full-resolution panchromatic image at each color pixel location of the noise-reduced digital image, wherein the color and corresponding panchromatic characteristics include a minimum of differences of directional gradients among color pixels in a valid pixel neighborhood of the first image and a minimum of differences of directional gradients among panchromatic pixels in a valid pixel neighborhood of the full-resolution panchromatic image.

* * * * *